United States Patent [19]

Morioka et al.

[11] Patent Number: 4,545,563
[45] Date of Patent: Oct. 8, 1985

[54] PRESSURE REGULATOR VALVE

[75] Inventors: Hiroaki Morioka; Naoji Sakakibara, both of Aichi, Japan

[73] Assignee: Aisin Seiki Kabushiki Kaisha, Aichi, Japan

[21] Appl. No.: 533,729

[22] Filed: Sep. 19, 1983

[30] Foreign Application Priority Data

Sep. 17, 1982 [JP] Japan .......................... 57-141679[U]

[51] Int. Cl.[4] ............................................... F16K 1/18
[52] U.S. Cl. .................................... 251/298; 251/303; 137/625.2
[58] Field of Search .............. 251/298, 299, 300, 303, 251/333, 138, 129; 91/459

[56] References Cited

U.S. PATENT DOCUMENTS

| 260,039 | 6/1882 | McCullough | 251/129 |
| 363,463 | 5/1887 | Hollerith | 251/129 |
| 896,120 | 8/1908 | Kramer | 251/129 |
| 4,249,457 | 2/1981 | Sakakibara | 137/625.65 |
| 4,397,443 | 8/1983 | Watanabe et al. | 251/138 |

FOREIGN PATENT DOCUMENTS

| 107332 | 12/1899 | Fed. Rep. of Germany | 251/129 |
| 2161617 | 10/1972 | Fed. Rep. of Germany | 251/129 |
| 2715718 | 10/1977 | Fed. Rep. of Germany | 251/129 |
| 55-70521 | 12/1981 | Japan | 251/129 |
| 673923 | 7/1947 | United Kingdom | 251/129 |
| 2094942 | 9/1982 | United Kingdom | 251/129 |

Primary Examiner—Martin P. Schwadron
Assistant Examiner—John S. Starsiak, Jr.
Attorney, Agent, or Firm—Sughrue, Mion, Zinn, Macpeak & Seas

[57] ABSTRACT

A pressure regulator valve having a housing defining an inner chamber with at least one inlet port and one outlet port disposed in communication with the chamber is provided with a solenoid operated valve arrangement within the chamber for alternately moving two valve elements into and out of engagement with the inlet and outlet ports. The valve elements are mounted on a common elastic support member which is mounted for pivotal movement and each valve element is provided with a sealing surface which is inclined relative to the elastic support plate so that when a valve element is brought into engagement with the valve seat of a respective port, the sealing surface of the valve element will be disposed in flush parallel engagement with the valve seat.

1 Claim, 6 Drawing Figures

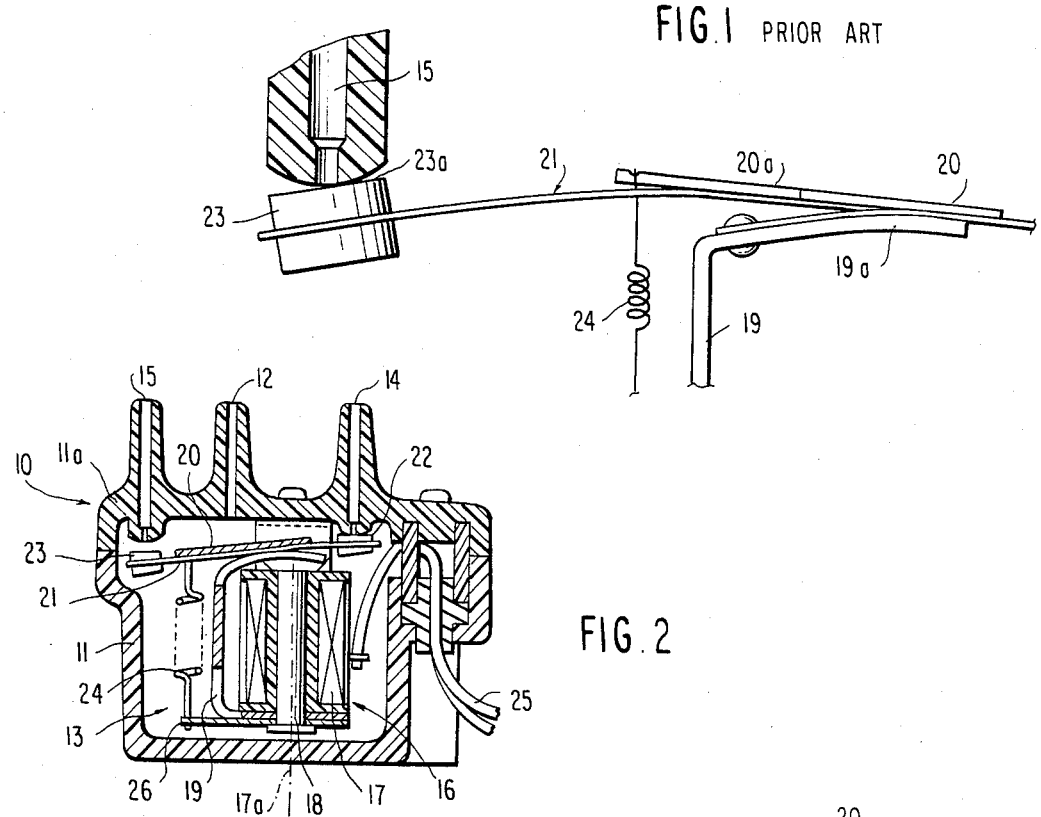
FIG.1 PRIOR ART
FIG.2
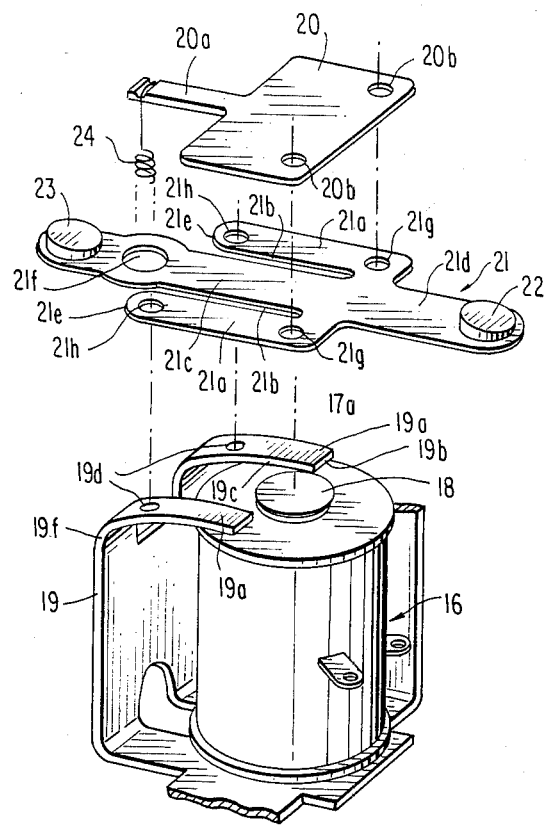
FIG.3

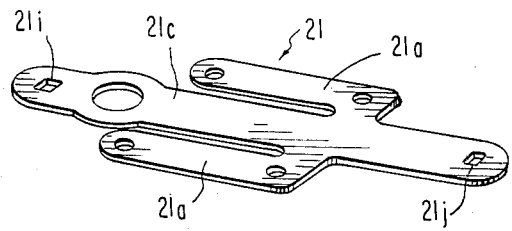
FIG.4
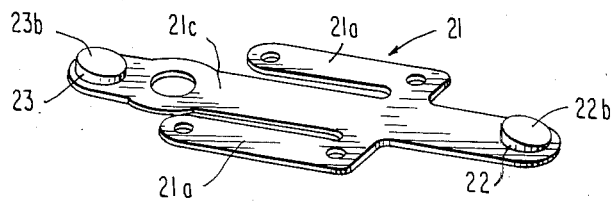
FIG.5
FIG.6
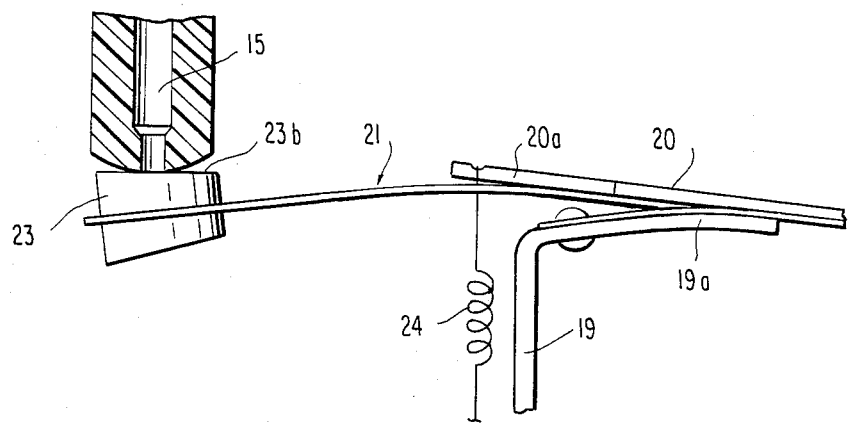

PRESSURE REGULATOR VALVE

BACKGROUND OF THE INVENTION

The present invention is directed to a pressure modulating valve assembly and more particularly to an electrically operated valve supporting member which is mounted in rolling contact with a yoke of a solenoid coil in response to the operation of the solenoid coil to modulate pressure in a valve chamber.

A conventional pressure modulating valve is disclosed in U.S. Pat. No. 4,249,457, granted Feb. 10, 1981, and entitled "Vacuum Servomotor". In the conventional pressure modulating valve assembly, an armature of magnetic material having recesses at opposite sides thereof is pivoted on a yoke member by means of upstanding projections formed at opposite sides of the yoke whereby the projections are loosely fitted within the recesses, respectively. A valve supporting member of non-magnetic material is secured to the armature and is provided with valve members at opposite ends thereof. Spring means are provided for biasing the armature to a first position wherein one of the valve members engages a valve seat and a solenoid coil is provided for biasing the armature to a second position against the force of the spring means to move the other valve member into engagement with a valve seat while moving the first mentioned valve member out of engagement with its respective valve seat. In the foregoing arrangement, the durability of the valve is lessened since the recesses of the armature and the projections on the yoke are quickly worn by the constant rubbing action which occurs on every rotation of the armature. Such wear eventually leads to undesirable tolerances which adversely affect the seating of the valve members on their respective seats.

In co-pending U.S. patent application Ser. No. 404,738, filed Aug. 3, 1982, now U.S. Pat. No. 4,446,889 which is assigned to the same assignee as the present application, a new and improved pressure modulating valve assembly was disclosed comprising a solenoid coil, yoke means having curved support surfaces extending from one end of said coil to the other, resilient non-magnetic valve supporting means having at least one valve secured thereto, and attaching leg means secured to said yoke means in overlying relation relative to said curve supporting surfaces, an armature of magnetic material secured to said valve supporting means at a central portion thereof spaced from the point of attachment of said valve supporting means to said yoke means and spring means normally biasing said armature in a direction away from said solenoid coil whereby upon energization of said coil, said solenoid supporting means and said armature secured thereto are subjected to a rolling motion along the curved surface of said yoke means to provide a friction-free connection between said yoke means and said combined armature and valve support means.

Such a valve is generally used as an exhaust gas recirculation system valve (EGR valve) in automobiles. The purpose of using such a valve is to generate an intermediate or middle level vacuum between the atmospheric pressure and the intake manifold vacuum. It is important to have a stable operational characteristic for this type of valve and the individual valve elements must be brought into air tight contact with the ports. As shown in FIG. 1 of the present application, a conventional type valve, which is only partially illustrated, is provided with a valve element 23 attached to an elastic plate 21. When an electromagnetic coil, such as that disclosed in application Ser. No. 404,738, is energized, the right side of the movable piece 20 is moved downwardly overcoming the force of the spring 24. Thus, the elastic plate 21, which is secured to the middle piece 20, is rotated about a point on the arm 19a of the yoke 19 to bring the element 23 into contact with the valve 4. Due to the location of the yoke 19 upon which the valve member is mounted relative to the valve port, the contact of the sealing surface 23a of the valve element 23 with the valve seat which surrounds the port 15 is linear, thus making an incomplete seal relative to the port which will allow the leakage of air past the valve element.

SUMMARY OF THE INVENTION

The present invention provides a new and improved pressure modulating valve assembly which obviates the above-mentioned disadvantages associated with prior pressure modulating valve assemblies.

The present invention provides a new and improved pressure modulating valve assembly wherein the valve element is provided with a sealing surface which is inclined relative to the elastic support plate so that upon movement of the valve element into engagement with the annular valve seat surrounding the port, the sealing surface will be in flush parallel engagement with the valve seat. In addition, the valve elements are provided with a rectilinear projection on the side thereof opposite the inclined sealing surface for insertion into a complementary rectilinear aperture in the elastic support plate to secure the valve element to the elastic plate while preventing relative rotation therein.

The foregoing and other objects, features, and advantages of the invention will be apparent from the following more particular description of a preferred embodiment of the invention as illustrated in the accompanying drawings.

BRIEF DESCRIPTION OF THE DRAWINGS

FIG. 1 is a partial cross sectional view of a prior art valve arrangement.

FIG. 2 is a cross sectional view of a valve assembly according to the present invention.

FIG. 3 is an exploded perspective view of the electromagnetic assembly and valve assembly according to the present invention.

FIG. 4 is a perspective view of the elastic support plate according to the present invention without the valve element mounted thereon.

FIG. 5 is a view similar to FIG. 4, but with the valve elements mounted on the elastic support plate.

FIG. 6 is a partial sectional view showing the inclined sealing surface of the valve element according to the present invention in parallel contact with the valve seat surrounding the air port.

DETAILED DESCRIPTION OF THE DRAWINGS

The pressure modulating valve assembly 10 as shown in the embodiment of FIG. 2 is provided with a casing 11 and a cover 11a having a pair of inlet ports 14, 15 and an outlet port 12. The cover 11a is adapted to be hermetically engaged with the casing 11 to define a valve chamber 13 therein. An electromagnet assembly 16 comprised of a core 18 and a solenoid coil 17 is carried by a yoke 19 which in turn is secured to the cover 11a.

The top portion of the yoke 19 is provided with a pair of curved arms 19a, 19a having free end portions 192b, 19b extending over the solenoid coil 17 on opposite sides of the central axis 17a. The lower end of the core 18 is secured to the bottom portion of the yoke 19 and the lead wires 25 connected to the coil 17 are hermetically sealed where they pass through an opening in the casing 11. An elongated flexible, resilient valve supporting member 21 of non-magnetic material is adapted to be secured to the curved arms 19a, 19a as best seen in the exploded view of FIG. 3. A pair of valve members 22 and 23 are secured to opposite ends of the valve supporting member at positions corresponding to the positions of the inlet ports 14 and 15, respectively. The valve supporting member 21 is provided with a pair of elongated legs 21a, 21a which extend parallel to the main body 21c of the valve supporting member on opposite sides thereof. The leg portions 21a, 21a are spaced from the body portion 21c by slots 21b, 21b. The leg portions 21a, 21a are provided with free end portions 21e, 21e and are of integral one piece constructions with a transverse connecting portion 21d at the opposite ends thereof. An opening 21f is provided intermediate the valve member 23 and the transversely extending connecting portion 21d to provide a passage for a spring 24, the arrangement and purpose of which will be described hereinafter.

A substantially rectangular armature 20 of magnetic material is secured to the valve supporting member by means of pins or rivets (not shown) extending through a pair of holes 21g, 21g located in the leg portions 21a, 21a adjacent the transversely extending connecting portion 21d and a pair of holes 20b, 20b formed in the armature 20. The valve supporting member 21 is in turn secured to the yoke 19 by pins or rivets (not shown) which extend through a pair of holes 21h, 21h formed in the free ends 21e, 21e of the leg portions 21a, 21a and a pair of holes 19d, 19d located adjacent the free ends 19b, 19b of the curved arms 19a, 19a of the yoke 19. An additional pair of holes 19e, 19e are provided in the curved portions of the arms 19a, 19a for receiving the ends of the pins or rivets which secure the armature to the valve supporting member. With the armature 20, the valve supporting member 21 and the yoke 19 secured in the foregoing manner, the armature 20 is positioned in overlying relation relative to the curved arms of the yoke 19 with the portion of the armature 20 closest to the valve member 22 being disposed in overlying relation relative to the core 18 of the elcectromagnet 16. A projection 20a extends outwardly from the opposite side of the armature 20 and one end of the spring 24 is secured to the projection 20a. The opposite end of the spring 24 is secured to a retainer plate 26 which is secured between the core 18 and the yoke 19 of the electromagnet assembly 16. The biasing force of the spring 24 urges the projection 20a of the armature 20 downwardly thereby maintaining the desired gap between the body 21c of the valve supporting member 21 and the core 18 when the solenoid coil 17 is in the de-energized condition. In this position, the valve member 22 is disposed in engagement with the valve seat surrounding the inlet port 14 and the valve member 23 is in spaced relation to the valve seat surrounding the inlet port 15. The central axis 17a of the electromagnet assembly 16 is positioned between the arms 19a, 19a of the yoke 19 whereby upon energization of the solenoid coil the armature 20 will be moved toward the electromagnet 16 against the biasing force of the spring 24. As the armature 20 and the valve support plate 21 which are secured together are drawn toward the electromagnet 16 the valve supporting plate pivots about a line extending transversely across the arms 19a, 19a, which line moves progressively along the curved surface of the arms. Thus, the valve supporting plate 21 and the armature 20 effectively rock on the curved arms with a rolling motion which is substantially friction free, thereby eliminating any possible wear between the arms of the yoke 19 and the valve supporting plate 21. The pivotal or rolling motion of the armature 20 continues until such time as the valve member 23 engages the seat surrounding the inlet port 15 and the valve member 22 is disengaged from the seat surrounding the inlet port 14.

When the solenoid coil 17 is de-energized and the valve supporting plate 21 and the armature 20 pivot in a rolling fashion about the curved arms of the yoke 19 under the influence of the spring 24 to return the valve members to the original condition. In the valve assembly according to the present invention the inlet port 14 may be in communication with a vacuum source such as the intake manifold of an automobile and the inlet port 15 may be in communication with the atmosphere. The valve members 22 and 23 are alternately moved into seating engagement with the valve seats surrounding the inlet ports 14 and 15 in accordance with the energization and de-energization of the solenoid coil which receives an electrical input signal such as a pulse frequency signal from a suitable source. Thus, the pressure in the valve chamber is modulated in accordance with the operation of the valve members 22 and 23. The modulated pressure in the valve chamber 13 is applied to a suitable actuator (not shown) through the outlet port 12.

As best seen in FIG. 4, the elastic plate 21 is provided with a pair of rectilinear holes 21i and 21j. The valve elements 22 and 23 are secured in the rectilinear holes 21i and 21j by means of complementary rectilinear projections (not shown) which extend from the sides of the valve members 22 and 23 opposite the seating surfaces 22b and 23b. Thus, the valve members 22 and 23 will be prevented from rotating relative to the elastic support plate 21. Each of the sealing surfaces 22b and 23b of the valve elements 22 and 23, respectively, are inclined relative to the surface of the elastic plate 21 when the plate is in the flat unstressed position as illustrated in FIG. 5. The inclination is such that upon pivotal movement of the valve element, such as the valve element 23 as shown in FIG. 6, the flat sealing surface 23b will be disposed in parallel, flush, sealing engagement with the valve seat surrounding the port 15 to provide a perfect seal. The same is true with respect to valve element 22 and its relation to the valve seat surrounding the port 14.

While the invention has been particularly shown and described with respect to preferred embodiments thereof, it will be understood by those in the art that the foregoing and other changes in form and details may be made therein without departing from the spirit and scope of the invention.

What is claimed is:

1. A pressure regulator valve assembly comprising a casing having a chamber therein, at least one port provided in said casing in communication with said chamber, a valve seat surrounding said port and located within said chamber, a valve element engageable with said valve seat, an elastic plate having means for securing said valve element to said plate, said valve element being provided with a flat sealing surface inclined relative to said elastic plate, means for preventing rotation of said valve element relative to said elastic support plate being comprised of a rectilinear hole formed in said elastic support plate for the reception of a complementary projection on said valve element to maintain the proper orientation of said inclined sealing surface relative to said valve seat, and means for moving said elastic plate to bring said valve element into and out of engagement with said valve seat whereby upon movement of said elastic plate to bring said valve element into engagement with said valve seat said flat sealing surface will be disposed in parallel sealing engagement with said valve seat.

* * * * *